IMAGE-REPRODUCING SYSTEM FOR A TELEVISION RECEIVER

Filed Sept. 13, 1962 3 Sheets-Sheet 1

IMAGE-REPRODUCING SYSTEM FOR A TELEVISION RECEIVER

Filed Sept. 13, 1962 3 Sheets-Sheet 2

United States Patent Office 3,255,310

Patented June 7, 1966

3,255,310

IMAGE-REPRODUCING SYSTEM FOR A TELEVISION RECEIVER

Bernard D. Loughlin, Huntington, N.Y., and Stephen P. Ronzheimer, Elmhurst, Ill., assignors to Hazeltine Research, Inc., a corporation of Illinois

Filed Sept. 13, 1962, Ser. No. 223,345

5 Claims. (Cl. 178—7.5)

The present invention relates to an image-reproducing system for a television receiver. More particularly, it relates to such a system embodying a novel technique of black level stabilization wherein the effect of certain operating characteristics of the picture tube are taken into account in determining the level at which the video signal is to be stabilized. In other words, the present invention teaches that the determination as to what is correct in black level stabilizing the video signal should, in the final analysis, be judged on the basis of what effect the stabilized signal has on the reproduced image under differing types of scene content.

When black level stabilization is employed in a television receiver, either by direct-current (D.-C.) restoration or by D.-C. coupling, it has heretofore been considered essential that some reference level in the video signal be stabilized at a fixed potential in the receiver. For example, in one known technique of black level stabilization, the peaks of the synchronizing (sync) pulses are stabilized at ground potential or some other fixed potential. Suitable biases are then applied to the image-reproducing device presumably so that the level corresponding to black in the video signal is reproduced as black in the image and so that all other shade levels in the image signal are also correctly reproduced. In copending application Serial No. 223,494, filed Sept. 13, 1962, and entitled "Control Apparatus for a Television Receiver," an improved form of control circuit is disclosed and claimed therein which stabilizes the blanking level of video signal at the aforementioned fixed potential, thereby insuring correct black level operation in the presence of variations in amplitude of the synchronizing pulses.

However, it has been found that even stabilizing the blanking level of the video signal at a fixed potential does not insure correct black level operation in the reproduced image. Thus, it has been found that as the content of the video signal varied with different types of scene content, black level shifts effectively occurred in the reproduced image even though the stabilization of the video signal applied to the input of the picture tube remained unchanged.

This can occur, for example, due to changes in picture tube operating potentials with different types of reproduced scene content, thereby resulting in changes in the level of input signal reproduced as black.

It is, therefore, an object of the present invention to provide an image-reproducing system for a television receiver which permits improved black level stabilization judged on the basis of its effect on the reproduced image.

It is also an object of the present invention to provide an image-reproducing system for a television receiver which correctly reproduces black level in the reproduced image over a desired range of scene contents.

In accordance with the invention, there is provided an image-reproducing system for a television receiver comprising, means for supplying a video signal, an image reproducer responsive to the video signal and to an undesirably fluctuating second signal which changes an operating characteristic of the image reproducer resulting in undesirable variation of signal level reproduced as black versus average scene brightness; control circuit means responsive to the video signal for deriving an automatic control signal usable for stabilizing a reference level of the video signal at a given potential; and means coupling the second signal to the control circuit means for permitting improved black level operation by causing the automatic control signal to be representative of adjustments required to maintain a substantially constant relation between the reference level and the operating characteristic over a range of average scene brightness.

For a better understanding of the present invention, together with other and further objects thereof, reference is had to the following description, taken in connection with the accompanying drawings, and its scope will be pointed out in the appended claims.

Referring to the drawings:

FIG. 1 is a diagrammatic representation of a portion of a television receiver used in explaining the present invention;

FIG. 2*a* is a voltage diagram used in explaining the present invention;

FIG. 2*b* is a diagram of an image-reproducing system operating characteristic which is useful in understanding the operation of the present invention;

Figure 1:
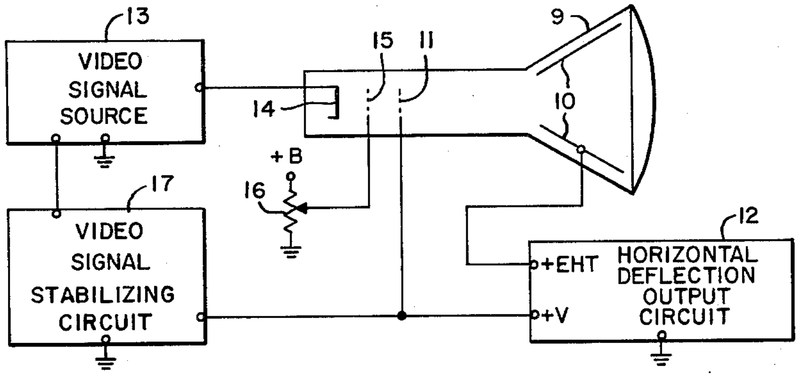
Figure 2A:
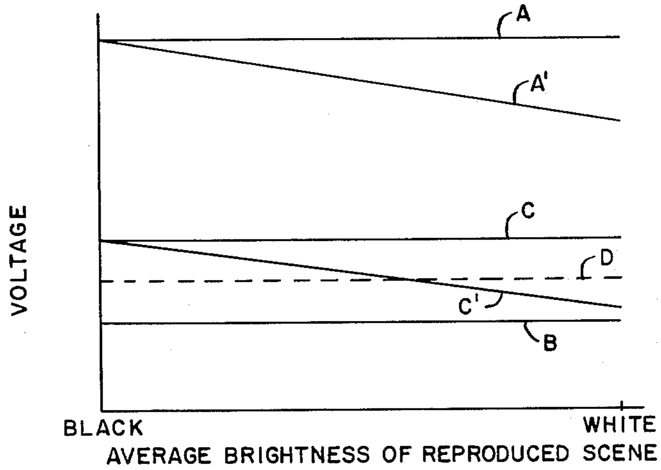
Figure 2B:
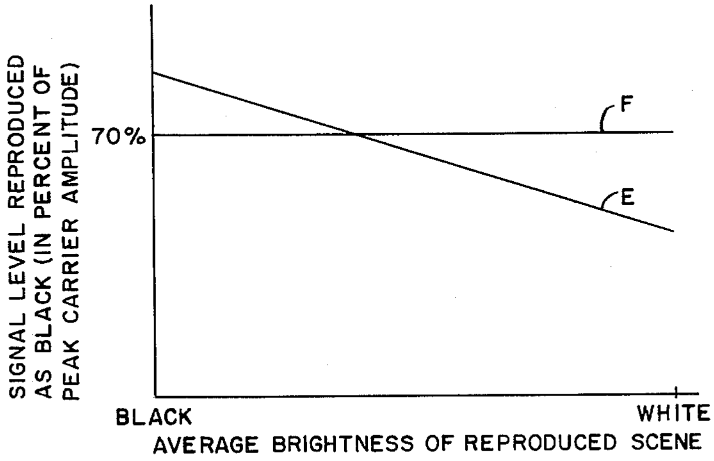
Figure 4:
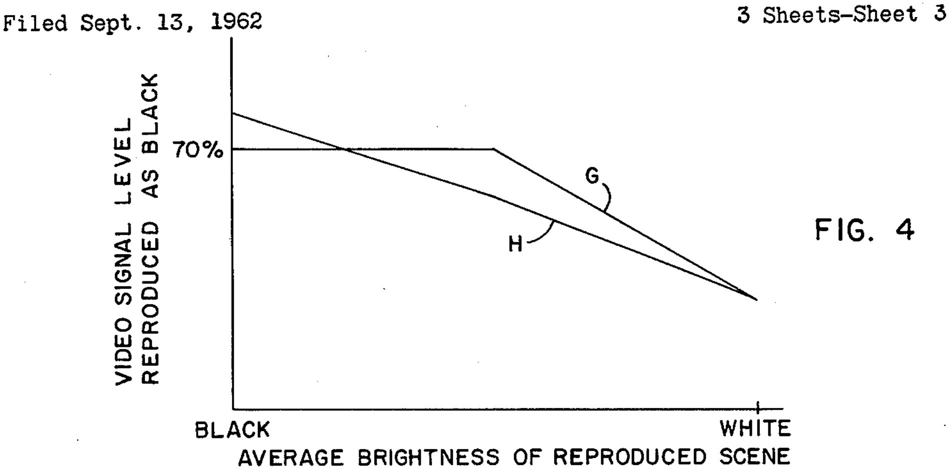
FIG. 4 is an image-reproducing system operating characteristic diagram similar to that of FIG. 2*b* and which is useful in explaining the operation of the television receiver of FIG. 3.

Before considering the present invention as it may be embodied in a complete television receiver such as is shown in FIG. 4, it may be helpful to first consider a general discussion of the invention with reference to FIGS. 1 and 2*a*–2*b*. In a television receiver of the type using, for example, a cathrode-ray tube as the image-reproducing device, shown in FIG. 1 as picture tube 9, it is presently conventional to provide the anode 10 thereof with a high positive D.-C. potential +EHT from a source 12 which is usually located in the output circuit of the horizontal deflection circuit. Generally, this voltage is derived by rectifying the flyback pulses produced in the horizontal output transformer circuit, and this circuit is the principal path for beam current flow. At the same time, another voltage +V is developed in the output of the horizontal deflection circuit in what is generally referred to as the boost circuit, and is applied to the second grid 11 of picture tube 9. Voltage +V is represented in the diagram of FIG. 2*a* as line A. It will be understood that the vertical axis therein is not drawn to any particular scale, the intent being merely to shown relative variations in picture tube electrode potentials. In one type of video circuit associated with the picture tube, the video signal is applied from the video signal source 13 to the picture tube cathode 14, while a D.C. potential, line B in FIG. 2*a*, is applied to the control grid 15 thereof by means of a brightness control potentiometer 16. Solid line C in FIG. 2*a* represents the beam current cutoff potential on cathode 14 relative to the potential +B on control grid 15. Numerous other modifiications of picture tube circuits as well known; however, the one shown in FIG. 1 will serve to provide a full understanding of the present invention.

It may be assumed that voltage +V is not affected in any way by variations in average beam current, and, therefore, remains constant along line A as the average reproduced scene brightness varies, good black level performance may be realized simply by stabilizing the video signal in any one of a number of well-known ways by means of stabilizing circuit 17 such that black level in the video signal occurs at the cathode 14 of picture tube 9 at a fixed potential corresponding to the cutoff potential, line C in FIG. 2*a*.

However, it can be shown that due to the interrelationship of the boost circuit and EHT rectifier circuit, the variations in voltage +EHT, caused by the loading effects of the varying average beam current, in turn cause the grid 11 voltage +V to vary as shown by sloping line A′ in FIG. 2*a*. It can also be shown that the variation in voltage +V on second grid 11 causes a related variation in cathode 14 of cutoff potential as shown by the sloping line C′ in FIG. 2*a*.

It can, therefore, be seen that if, in accordance with prior known practices, the video signal were stabilized such that black level occurred at a fixed potential, for example represented by dotted line D in FIG. 2*a*, for all values of average reproduced scene brightness, the resulting black level operation would be correct at only one value of reproduced scene brightness corresponding to the intersection of lines C′ and D.

Since it is not practical to provide a constant voltage +V at the output of the boost circuit, means are therefore provided, according to the invention, for controlling the video signal stabilization such that the potential at which black level occurs is made to vary in a manner which compensates for the aforedescribed variation in grid-cathode cutoff potential. In effect, it is made to "track" the cutoff potential variations. To this end, a signal indicative of the voltage variations on the second grid 11, which may most conveniently be the voltage +V itself, is applied to the video signal stabilizing circuit 17 in such a way as to vary the stabilization in the prescribed manner. This is shown in the diagram of FIG. 2*b* which shows the characteristic of video signal level reproduced as black vs. average brightness of the reproduced scene for a typical television receiver image-reproducing system. Thus, sloping line E illustrates the effective black level shift which may occurs as described above, while solid line F corresponds to the true black level stabilization achieved by parying the level at which the video signal is stabilized in a manner to compensate for the aforedescribed variation in grid-cathode cutoff potential.

Figure 3:
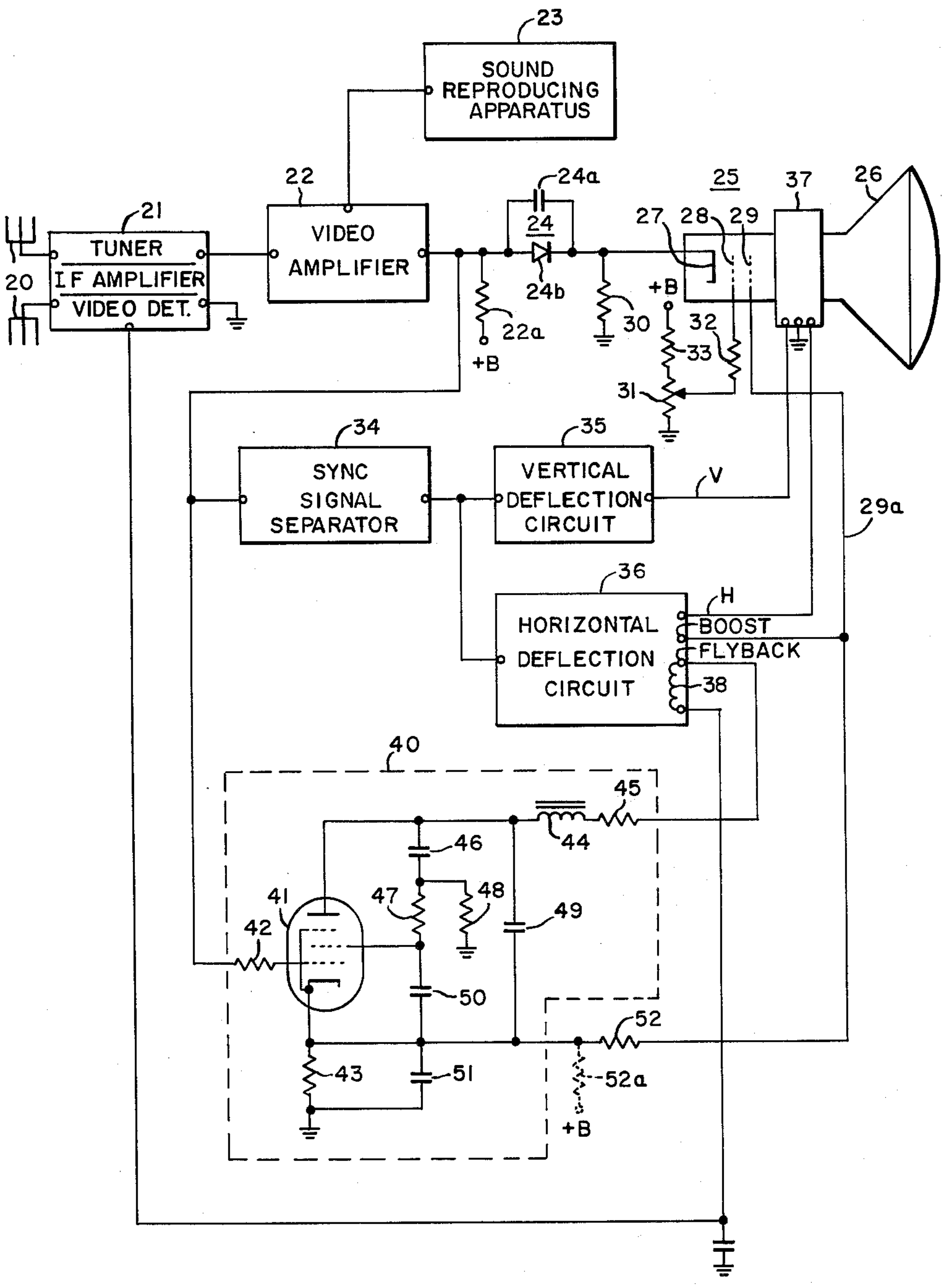
FIG. 3 is a diagram of a television receiver illustrating an embodiment of the present invention.

Referring now to FIG.3, the manner in which the present invention is embodied in a complete television receiver will be considered. There is thus shown a television receiver including an antenna 20, connected to the input of receiver unit 21, which includes the usual tuner, intermediate-frequency amplifier, and video detector stages. The output of the video detector is connected by means of a D.-C. connection to the input of video amplifier 22, one output of which is connected to the input of sound-reproducing apparatus 23, wherein the sound portion of the television program is reproduced in a conventional manner. Another output of video amplifier 22 which may, for example, be the connection from the anode of the video amplifier tube is coupled through coupling network 24 to the cathode 27 of the picture tube 26 in image-reproducing means 25. A video amplifier load resistor **22*a* is connected from the video amplifier anode to a source of positive potential +B. A resistor 30 of relatively high value in order to provide substantial D.-C. degeneration in the cathode circuit of picture tube 26 is connected from the cathode 27 thereof to ground. A D.-C. bias potential is applied to control grid 28 of picture tube 26 by means of a brightness control circuit including potentiometer 31, resistor 33, and resistor 32**.

Coupling network 24 and its operation are described in full and claimed in copending application Serial No. 215,964, filed August 9, 1962, and entitled "Black Level Stabilization System for a Television Receiver." Briefly, however, it provides a D.-C. connection from the output of video amplifier 22 to the cathode 27 of picture tube 26 on scenes of low average brightness level. In this way, video signal stabilization in the form of D.-C. coupling can be realized on these low average brightness scenes. As explained in the above application, video signals corresponding to scenes of high average brightness levels, if D.C. coupled to picture tube 26, may draw average beam currents sufficient to overload the high voltage +EHT supply circuit in the output of horizontal deflection circuit 36, thereby degrading the performance of the image-reproducing system. It will be appreciated that this effect is in addition to the aforedescribed undesired effect that the loading of the high voltage supply has on black level performance. During the occurrence of these high average brightness scenes, the average beam current drawn from picture tube 26 produces a voltage across cathode resistor 30 which back-biases coupling diode **24*b*, thereby leaving only the A.-C. coupling through capacitor 24*a* between video amplifier 22 and cathode 27. By this means, the average beam current in picture tube 26** is prevented from going above the maximum desirable average beam current flow short of reaching objectionable high voltage supply overload.

The diagram in FIG. 4 is similar to that of FIG. 2*b* and shows the video signal level reproduced as black as a function of average brightness of the reproduced scene. The desired D.-C. coupled mode of operation on low average brightness scenes corresponds to operation along the horizontal portion of line G, while the A.-C. coupled mode of operation corresponds to operation along the slanted portion of line G.

Referring again to FIG. 3, the television receiver shown therein further includes a synchronizing signal separator 34, to which is applied the video signal from the output of video amplifier 22. The separated vertical and horizontal synchronizing pulses are applied to vertical deflection circuit 35 and horizontal deflection circuit 36, respectively, wherein the vertical and horizontal deflection signals are produced and applied to deflection yoke 37 of image-reproducing means 25. The aforementioned second grid 29 voltage +V is produced in the boost circuit in the output circuit of horizontal deflection circuit 36 and is applied via connection **29*a* to the second grid 29 of picture tube 26**.

There is also provided in the television receiver of FIG. 3 automatic-gain-control (AGC) circuit 40, which operates to control the gain of the amplifier stages in receiver unit 21 to stabilize blanking level of the video signal at the output of video amplifier 22 at a given potential corresponding to that desired for correct black level stabilization operation for at least one value of average scene brightness represented by the video signal.

The video signal at the output of video amplifier 22 is coupled to AGC circuit 40, specifically through input resistor 42 to the control grid of pentode 41. The cathode of pentode 41 is coupled to ground through a network comprising resistor 43 and capacitor 51, connected in parallel. Network 43, 51 comprises part of a cathode bias network for pentode 41, the other part of the network being resistor 52 connected in accordance with the teachings of the present invention to the boost circuit output connection **29*a*. In this way, a variable bias is applied to the cathode of pentode 41** to permit a variation in the level at which the video signal is ultimately stabilized.

Pentode 41 is keyed into plate current conduction only during the back porch interval of the applied video signal. To this end, flyback pulses from winding 38 on the horizontal output transformer are coupled through a first delay circuit comprising resistor 45, inductor 44, and capacitor 49 to the anode of pentode 41. This delayed pulse is also coupled by means of the circuit comprising capacitor 46 and resistor 48 through a further delay circuit comprising resistor 47 and capacitor 50 to the screen of pentode 41.

As thus far described, with the exception of the connection of resistor 52 to boost circuit output connection **29*a*, AGC circuit 40 comprises a keyed automatic-gain-control circuit which is fully described and claimed in copending application Serial No. 223,494, filed Sept. 13, 1962, and entitled "Control Apparatus for a Television Receiver," and which serves by means of differentially delayed flyback pulses applied to the plate and screen of pentode 41 to derive an automatic-gain-control potential only from the blanking level of the applied video signal. Assuming a fixed bias on the cathode of pentode 41 as would normally be used in accordance with the teachings of prior known AGC circuits, the blanking level of the video signal is thereby stabilized at the output of video amplifier 22 at a given potential which, as previously explained, is capable of providing correct black level operation in image-reproducing means 25** for only one value of average reproduced scene brightness. This corresponds to operation in FIG. 4 along the characteristic line H.

However, in accordance with the teachings of the present invention, the variations in the grid 29 voltage +V appearing at connection **29*a* and which are connected through resistor 52 to the cathode bias network 43, 51 of pentode 41 causes a lesser or less positive voltage at the cathode of pentode 41 and, in turn, causes an increased or more negative automatic-gain-control voltage to be produced at the plate thereof. When coupled through the flyback winding 38 to the amplifiers in receiver unit 21, this reduces the gain of the amplifier stages therein and thereby lowers the blanking level of the video signal at the output of video amplifier 22. Thus, in effect, the potential at which the blanking level of the video signal is stabilized is made to track the variations in cutoff potential between control grid 28 and cathode 27, by the varying grid 29 voltage. Stated another way, since the blanking level of the video signal at the output of video amplifier 22 is stabilized at a level which is only slightly negative with respect to the cathode potential of keyed rectifier tube 41, the variations in the bias on the tube 41 cathode cause the potential at which blanking level is stabilized to be varied in the desired manner to track the variations in picture tube cutoff potential. The resultant operating characteristic follows line G in FIG. 4. It should be noted that correct black level operation is now achieved over the desired range of average scene brightnesses. In the event that it is not desired to use the entire voltage variations appearing at connection 29*a*, the amount used may be controlled by inserting a resistor 52*a* shown in dotted outline connected to voltage +B. The relative values of resistors 52 and 52*a* would then indicate the magnitude of the voltage variations used to vary the cathode bias on pentode 41**.

While applicants do not wish to be limited to any particular set of circuit constants, the following have proved useful in the television receiver image-reproducing system of FIG. 3:

| | | |
|---|---|---|
| Resistor **22*a*** | kilohms | 5.4 |
| Resistor **30** | do | 680 |
| Resistor **32** | do | 150 |
| Resistor **33** | do | 100 |
| Resistor **42** | do | 18 |
| Resistor **43** | do | 47 |
| Resistor **45** | do | 6.8 |
| Resistor **47** | do | 100 |
| Resistor **48** | do | 330 |
| Resistor **52** | do | 100 |
| Potentiometer **31** | kilohms (max.) | 100 |
| Capacitor **24*a*** | microfarad | 0.22 |
| Capacitor **46** | picofarads | 5000 |
| Capacitor **49** | do | 150 |
| Capacitor **50** | do | 43 |
| Capacitor **51** | microfarad | 0.1 |
| Inductor **44** | millihenries | 20 |
| Diode **24*b*** | | 1N34A |
| Picture tube **26** | | 21CEP4 |
| Pentode **41** | | ½ 5AN8 |
| Potential +B | volts | +265 |
| Grid **29** voltage | volts (nominal) | 640 |

Figure 5:
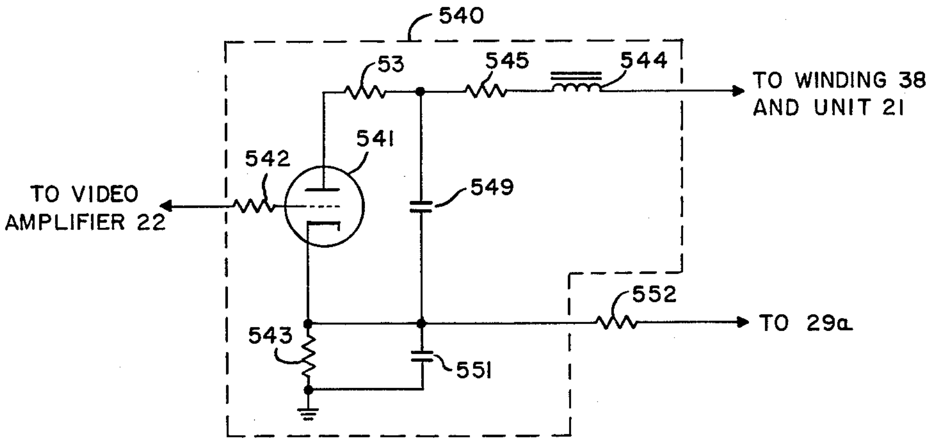
FIG. 5 is a diagram of a modified control circuit useful in an image-reproducing system constructed in accordance with another form of the present invention.

There is shown in FIG. 5 a modified form of an automatic-gain-control circuit 540 similar to automatic-gain-control circuit 40 of FIG. 3, in which corresponding components carry the same reference numerals as in FIG. 3, except preceded by the numeral 5. Control circuit 540 has the advantage of being simpler in construction and, therefore, less expensive than that of circuit 40 of FIG. 3. This circuit, except for the coupling of resistor 552 to the boost connection **29*a*, is fully disclosed and claimed in copending application Serial No. 223,494, filed Sept. 13, 1962, and entitled "Control Apparatus for a Television Receiver." Aside from the differences in construction which are apparent from an observation of the respective figures, the operation of control circuit 540 is the same as that described in connection with control circuit 40**, and a repetition thereof is therefore considered unnecessary.

Figure 6:
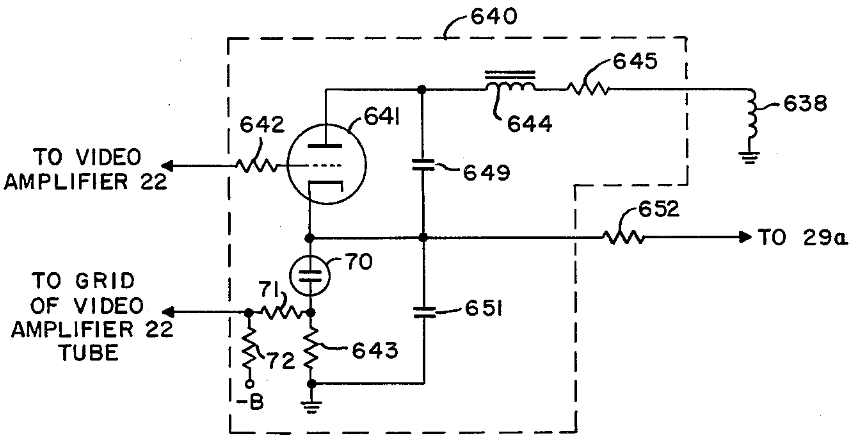
FIG. 6 is a diagram of a further modified control circuit useful in an image-reproducing system constructed in accordance with another form of the present invention.

In FIG. 6 there is shown a control apparatus 640 differing from the previously described circuits in that it operates as a D.-C. restoration circuit, rather than an automatic-gain-control circuit. This circuit, again with the exception of the coupling of resistor 652 to connection **29*a*, is fully disclosed and claimed in the aforementioned copending application. Briefly, however, the video signal from video amplifier 22 is coupled through input resistor 642 to keyed rectifier 641 to the plate of which delayed flyback pulses are applied through resistor 645 and inductor 644 to key tube 641 into conduction on the back porch, i.e. blanking level, of the video signal. A cathode circuit comprising neon tube 70, cathode resistor 643, in shunt with capacitor 651, is connected to ground. The voltage developed across resistor 643 is applied to the grid of the amplifier tube in video amplifier 22 through a voltage dividing network comprising resistors 71 and 72, connected to a source of negative potential −B. This voltage is utilized to vary the bias on the tube of video amplifier 22 to stabilize the blanking level at the output of amplifier 22 at the aforedescribed level corresponding to that which is required for correct black level operation for at least one value of average scene brightness. In order that correct black level operation be realized over the desired range of average scene brightnesses, the varying voltage from the boost circuit appearing at connection 29*a* is coupled through resistor 652 to the cathode of tube 641, to vary the control bias developed across resistor 643 in the same manner as described with respect to control circuits 40 and 540**.

Since the circuit of FIG. 6 is intended as a D.-C. restoration circuit, A.-C. coupling is necessary at a point prior to the point at which the control bias is applied to the tube of video amplifier 22. For example, the output of the video detector may be A.-C. coupled through a capacitor (not shown) to the grid of the video amplifier tube.

While there have been described what are, at present, considered to be the preferred embodiments of the present invention, it will be obvious to those skilled in the art that various changes and modifications may be made therein without departing from the invention, and it is, therefore, aimed to cover all such changes and modifications as fall within the true spirit and scope of the invention.

What is claimed is:

1. An image-reproducing system for a television receiver, comprising:
- means for supplying a video signal;
- an image reproducer responsive to said video signal and to an undesirably fluctuating second signal which changes an operating characteristic of said image reproducer resulting in undesirable variation of signal level reproduced as black versus average scene brightness;
- control circuit means responsive to said video signal for deriving an automatic control signal usable for stabilizing a reference level of said video signal at a given potential;
- and means coupling said second signal to said control circuit means for permitting improved black level operation by causing said automatic control signal to be representative of adjustments required to maintain a substantially constant relation between said reference level and said operating characteristic over a range of average scene brightness.

2. An image-reproducing system in accordance with claim 1 in which said supply means includes a circuit for amplifying said video signal and in which said control circuit means includes an automatic-gain-control circuit responsive to said supplied video signal and to said second signal for deriving an automatic-gain-control effect for controlling the gain of said amplifier circuit in a manner to compensate for said undesirably varying image reproducer characteristic.

3. An image-reproducing system for a television receiver, comprising:
- means for supplying a video signal, including a circuit for amplifying said video signal;
- an image reproducer responsive to said video signal and to an undesirably fluctuating second signal which changes an operating characteristic of said image reproducer resulting in undesirable variation of signal level reproduced as black versus average scene brightness;
- control circuit means including a D.-C. restoration circuit responsive to said video signal for deriving a D.-C. control effect for stabilizing a reference level of said video signal at a given potential;
- and means coupling said second signal to said D.-C. restoration circuit, which circuit is responsive thereto, for permitting improved black level operation by causing said D.-C. control effect to be representative of the adjustments required in the operating point of said amplifier means to compensate for said undesirably varying image reproducer characteristic so as to maintain a substantially constant relation between said reference level and said operating characteristic over a range of average scene brightness.

4. An image-reproducing system for a television receiver, comprising:
- means for supplying a video signal including a circuit for amplifying said video signal;
- image-reproducing means for reproducing an image from said signal, said image-reproducing means including a cathode-ray tube having a second grid and including a voltage source for said second grid which is capable of varying as a result of variations in average beam current in said cathode-ray tube, the variations in the voltage supplied to the second grid causing variations in tube cutoff;
- and control circuit means responsive to said video signal and a signal indicative of the changes in the second grid voltage for causing the operating point of said video signal amplifier to vary in response to the changes in said second grid voltage for maintaining a substantially constant relationship between a reference level of the video signal and tube cutoff potential over a range of average scene brightnesses.

5. An image-reproducing system for a television receiver comprising:
- means for supplying a video signal;
- image-reproducing means for reproducing an image from said signal, said image-reproducing means including a cathode-ray tube having a second grid and including a voltage source for said second grid, said second grid voltage capable of varying as a result of variations in average beam current in said cathode-ray tube, said voltage variations causing a varying average signal level versus reproduced black level characteristic for said image-reproducing means;
- control circuit means for stabilizing a reference level of said video signal at a given potential;
- and means coupling said voltage source to said control circuit means for altering an operating characteristic of said control circuit means to vary the potential at which said reference level is stabilized in a manner to compensate for said varying characteristic;
- whereby correct black level operation is achieved in said reproduced image over at least a range of average video signal levels.

References Cited by the Examiner

UNITED STATES PATENTS

| | | | |
|---|---|---|---|
| 2,743,313 | 4/1956 | Schwarz | 178—7.5 |
| 2,871,288 | 1/1959 | Thomas | 178—7.5 |
| 2,970,088 | 1/1961 | Kroger | 178—7.5 |
| 2,978,539 | 4/1961 | Fisher | 178—7.5 |

OTHER REFERENCES

Soller, Starr, and Valley, Cathode Ray Tube Displays, McGraw-Hill, New York, 1948. TK 7872 C2 S6, pp. 39–92.

DAVID G. REDINBAUGH, *Primary Examiner.*

R. MURRAY, *Examiner.*

J. McHUGH, *Assistant Examiner.*